April 4, 1950 E. VON SUPPINY, SR 2,502,609
LENS ATTACHMENT ADAPTER FOR CAMERAS
Filed Nov. 15, 1946
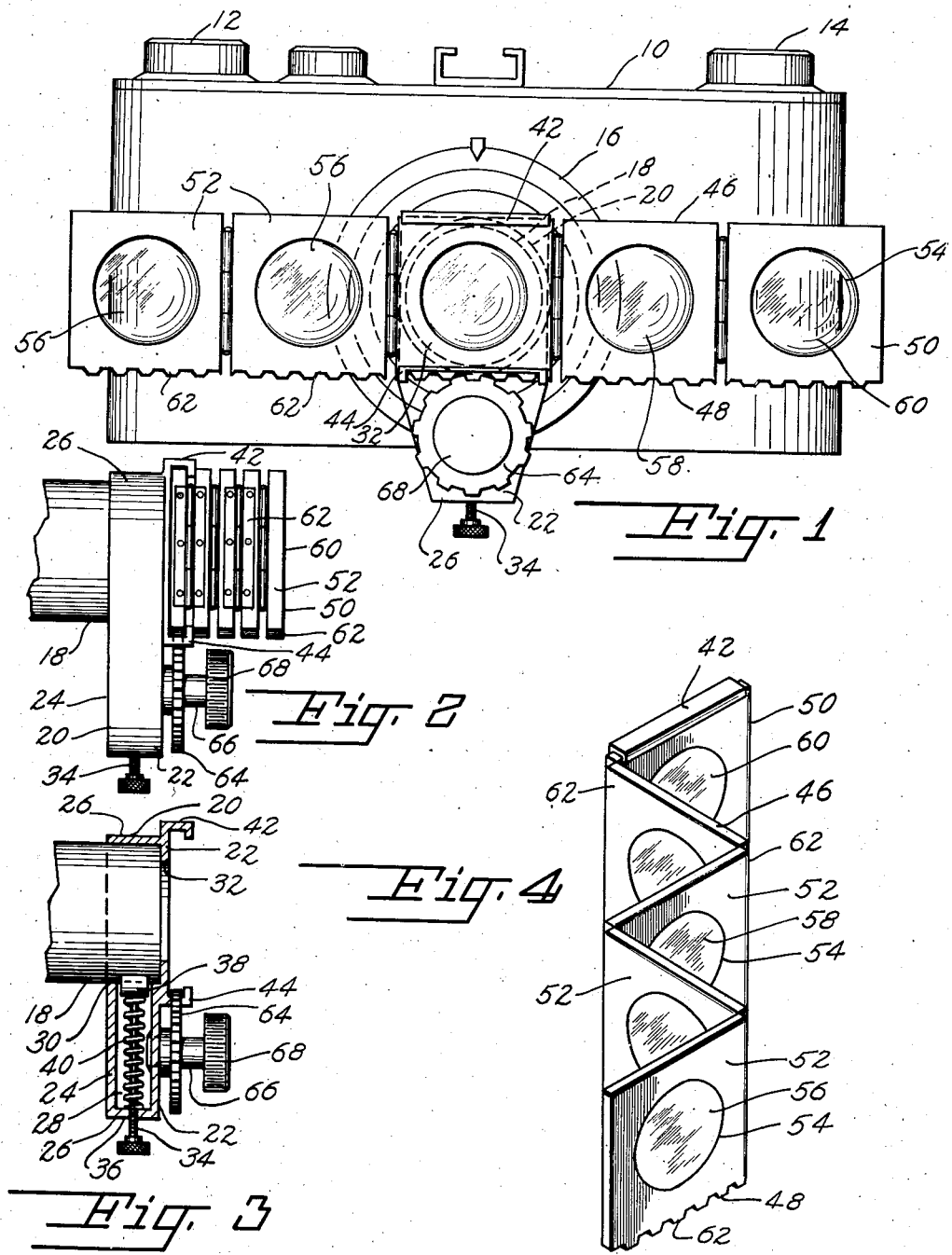
INVENTOR.
Edmund Von Suppiny Sr.
BY
McMorrow, Berman & Davidson
Attorneys Patented Apr. 4, 1950

2,502,609

UNITED STATES PATENT OFFICE 2,502,609

LENS ATTACHMENT ADAPTER FOR CAMERAS

Edmund Von Suppiny, Sr., Newark, N. J.

Application November 15, 1946, Serial No. 710,095

2 Claims. (Cl. 95—81.5)

This invention relates to adapters for attaching filters and other accessories to cameras.

In photography, it is often necessary to employ some auxiliary lens attachments, such as filters of different colors and densities, portrait lenses, and similar accessories, which are normally necessarily carried separately from the camera. However, the selection of the most suitable accessory lens, filter or other accessory entails too much trouble for most users of cameras. Hence, while the use of such devices as light-filters is of the utmost necessity in bringing out certain characteristics of the subject photographed, it actually happens that the average photographer does not attempt to achieve these characteristics in the finished photograph due to the bother of searching in his kit for the auxiliary filters and other lenses.

Accordingly it is an object of this invention to provide a means whereby a number of such lenses and light filters are carried right on the camera, ready at all times for use by the photographer.

Another object of the invention is to provide a lens accessory attachment adapter for cameras which is easily mounted on a camera without requiring any structural alteration or modification thereof.

A further object of the invention is to provide a device of the character described, which is provided with means for quickly and easily sliding or moving into position, any desired lens attachment without the necessity of making any preliminary adjustments before operating the camera.

Still another object of the invention is to provide a device of the type described, which is simple in design, inexpensive to manufacture, and which is effective for the purpose intended.

Other objects and advantages of the invention will become apparent from the following description of a preferred embodiment thereof as illustrated in the accompanying drawings, and in which:

Figure 1 is a front elevational view of a camera with my device mounted thereon, the device being in extended position, Figure 2 is a left side elevational view of the accessory attachment shown in Figure 1, with the lens accessory elements thereof folded up, Figure 3 is a sectional elevation of the device shown in Figure 2, without the lens accessory element strip, and Figure 4 is a perspective view of the lens accessory strip, showing it partly folded.

In order to understand clearly the nature of the invention and the means by which it may be carried out, reference may now be had to the drawings, in which like reference characters denote similar parts throughout the several views. As shown, there is a camera 10 of any suitable type, a candid type camera being illustrated only by way of example. The camera has knobs 12 and 14 for turning new sections of film into position for being exposed, and has a lens housing or shutter 16 from which projects a cylindrical lens holder 18 containing a lens mounted coaxially therein, the forward portion of the lens holder being open to allow light to enter the lens and the interior of the camera to expose the film.

It is proposed to mount my improved lens accessory attachment upon the forwardly projecting cylindrical lens housing 16 in such a manner as to add to its effectiveness and to make for utmost convenience. For this purpose, I provide a housing 20 having spaced front and rear plates 22 and 24 interconnected by outer walls 26, thus forming a recess or chamber 28 therebetween.

The wall 24 is apertured at 30 to receive the lens housing 18 which thus projects into the recess 28 with its forward end up against the inner surface of the wall 22, the latter being apertured at 32 to allow light to enter the lens. A rod 34 is extended threadedly through an aperture 36 in the wall 26 and has its shank extending upwards into the recess 28, its inner end being swiveled into a shoe 38 the upper surface of which is curved arcuately to bear closely against the surface of the lens holder 18, under the influence of a spring 40 which biases the shoe upwards. The housing 20 is thus held firmly upon the lens holder 18 against accidental dislodgement therefrom.

Upper and lower flanges or channels 42 and 44 on the housing wall 22 form a slideway normal to the axis of said lens and extending across the front thereof for the reception of the upper and lower marginal edges 46 and 48 respectively of the lens accessory strip 50. The lens accessory strip comprises an assembly of a plurality of frames 52 each having an accessory-mounting opening 54 therein to receive such lens accessories as lens filters 56, or portrait lenses 58, and a lens cap 60.

These sections 52 are hinged together by means of hinges 62 in order to enable them to be folded alternately in opposite directions (Figure 4) one against the other as illustrated, or to be opened out as shown in Figure 1 for use. It is apparent that the strip 50 may be moved manually along the tracks 42 and 44, to dispose any desired filter, or portrait attachment in axial alignment with the lens of the camera, in order to cooperate therewith. And when the camera is not being used, it is easy to fold the strip sections 52 one upon the other as shown in Figure 2, with the lens cap 60 outermost, to protect the lens and the accessory lenses.

The accessory sections 52 may also be provided with a rack of teeth 62 for engagement with a pinion 64 which is carried on a shaft 66 journaled in an aperture formed in the wall 22 of the housing as shown in Figures 1 and 3, a knob 68 permitting the pinion to be turned to move any desired lens accessory section 52 into position as desired.

The lens cap itself may be folded out of the way of the camera lens, when desired, permitting a picture to be taken without any filter.

Although I have described a preferred embodiment of my invention, it is to be understood that various changes may be made in sizes, shape, materials and arrangement without departing from the spirit and scope of the invention as claimed.

I claim:

1. An adapter for a camera having a lens comprising a housing adapted to be mounted in surrounding relation with respect to said lens, a pair of horizontally disposed channels arranged in opposed spaced relation with respect to each other and projecting from a face of said housing to thereby provide a slideway, a lens accessory strip positioned in said slideway and mounted for step by step sliding movement therein, said accessory strip comprising a plurality of individual lens mounts arranged in end-to-end relation with respect to each other and having their facing ends hingedly connected together, each of said mounts embodying a frame formed with an accessory-mounting opening therein, the lower edge of each frame being provided with serrations, a gear positioned below said slideway and mounted on said housing for rotation about a horizontal axis, said gear having teeth in meshing engagement with the serrations on the lower edge of an adjacent one of said frames and means operatively connected to said gear for rotating the latter clockwise and counter-clockwise to thereby position select ones of the accessory-mounting openings in said frames in aligned relation with said lens.

2. An adapter for a camera having a lens comprising a housing adapted to be mounted in surrounding relation with respect to said lens, a pair of horizontally disposed channels arranged in opposed spaced relation with respect to each other and projecting from a face of said housing to thereby provide a slideway, a lens accessory strip positioned in said slideway and mounted for step-by-step sliding movement therein, said accessory strip comprising a plurality of lens mounts arranged in end-to-end relation with respect to each other and having their facing ends hingedly connected together, said lens mounts being foldable alternately in opposite directions on said hinged ends to a folded position forming a single stack of superposed mounts, each of said mounts embodying a frame formed with an accessory-mounting opening therein, the lower edge of each frame being provided with serrations, a gear positioned below said slideway and mounted on said housing for rotation about a horizontal axis, said gear having teeth in meshing engagement with the serrations on the lower edge of an adjacent one of said frames, and means operatively connected to said gear for rotating the latter clockwise and counter-clockwise to thereby position select ones of the accessory-mounting openings in said frames in aligned relation with said lens.

EDMUND VON SUPPINY, Sr.

REFERENCES CITED

The following references are of record in the file of this patent:

UNITED STATES PATENTS

| Number | Name | Date |
| --- | --- | --- |
| 1,028,692 | Dusseris et al. | June 4, 1912 |
| 1,060,128 | Roebuck | Apr. 29, 1913 |
| 1,072,861 | Koike | Sept. 9, 1913 |
| 1,247,273 | Hochstetter | Nov. 20, 1917 |
| 1,590,704 | Semelroth | June 29, 1926 |
| 1,650,657 | Schwannhauser | Nov. 29, 1927 |
| 1,626,841 | Kelley et al. | May 3, 1927 |

FOREIGN PATENTS

| Number | Country | Date |
| --- | --- | --- |
| 12,235 | Great Britain | of 1906 |